United States Patent

Yamamura et al.

[11] Patent Number: 5,880,815
[45] Date of Patent: Mar. 9, 1999

[54] IMAGE PICKUP APPARATUS CAPABLE OF PREVENTING OVERLAP OR LACK OF IMAGE

[75] Inventors: Yoshihiro Yamamura; Nobushige Akita; Shigeru Yamaguchi; Seisuke Ohba; Hideo Murata; Tetsuya Itano; Kazuhiro Niino, all of Tokyo, Japan

[73] Assignees: NEC Corporation; Sony Corporation, both of Tokyo, Japan

[21] Appl. No.: 784,384

[22] Filed: Jan. 17, 1997

[30] Foreign Application Priority Data

Jan. 17, 1996 [JP] Japan .................................... 8-005499

[51] Int. Cl.⁶ .................................................. G03B 37/04
[52] U.S. Cl. ................................................ 352/70; 352/71
[58] Field of Search ........................................ 3521/70, 71

[56] References Cited

U.S. PATENT DOCUMENTS

| | | | |
|---|---|---|---|
| 2,918,843 | 12/1959 | Smith | 352/70 |
| 2,931,267 | 4/1960 | Hoch | 352/70 |
| 2,966,095 | 12/1960 | Waller | 352/70 |
| 3,031,920 | 5/1962 | Smith | 352/71 |
| 3,118,340 | 1/1964 | Iwerks | 352/70 |
| 3,356,002 | 12/1967 | Raitiere | 352/70 |

FOREIGN PATENT DOCUMENTS 219447  1/1958  Australia .................................. 352/71

Primary Examiner—Russell Adams
Attorney, Agent, or Firm—Foley & Lardner

[57] ABSTRACT

In a image pickup apparatus having three cameras for use in picking up a seamless panoramic image for a multi-screen, angles of view of the three cameras are jointed with each other without any overlapping or dead areas by making a side boundary line of one camera match with a complimentary side boundary line of another camera, the two outside cameras receiving an image in reverse through two reflection mirrors. The two reversed images are electrically or optically inverted by inversion sections to obtain original images.

9 Claims, 5 Drawing Sheets

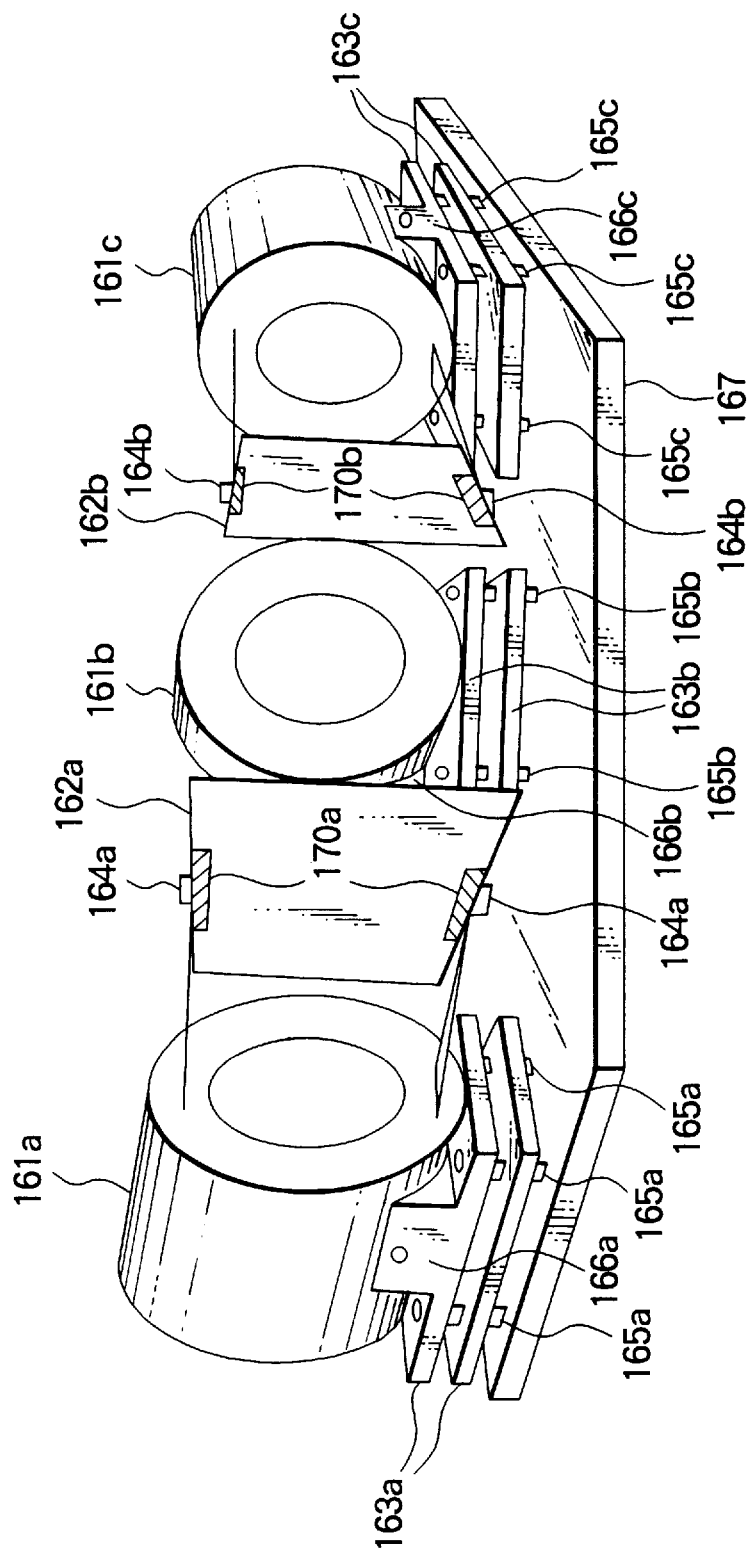

IMAGE PICKUP APPARATUS CAPABLE OF PREVENTING OVERLAP OR LACK OF IMAGE

BACKGROUND OF THE INVENTION

This invention relates to an image pickup apparatus for use in picking up a seamless panoramic image in a multi-screen.

A conventional image pickup apparatus of the type described comprises first, second, and third cameras. The first camera has a first angle of view which is capable of picking up a first image of an object therein and which has a first left and right side boundary lines. The second camera has a second angle of view which is capable of picking up a second image of an object therein and which has a second left and right side boundary lines. The third camera has a third angle of view which is capable of picking up a third image of an object therein and which has a third left and right side boundary lines.

However, the first angle of view and the second angle of view are overlapped with each other to form a cross angle of view while the second angle of view and the third angle of view are overlapped with each other to form another cross angle of view. Accordingly, an object, which is positioned in the cross angles of views, is picked up to be displayed as overlapped images in the multi-screen. On the other hand, it is inevitably caused to occur that some areas are not covered by any of the first, the second, and the third angles of views in the conventional image pickup apparatus. As a result, an object is never picked up by the first, the second, and the third cameras, when the object is positioned in the aforesaid uncovered areas. Consequently, the object is not displayed in the multi-screen.

Thus, in the conventional image pickup apparatus, it is inevitable that an overlap or a lack of image is caused to occur in the multi-screen.

SUMMARY OF THE INVENTION

It is therefore an object of this invention to provide an image pickup apparatus in which an overlap or a lack of image can be prevented.

Other objects of this invention will become clear as the description proceeds.

According to an aspect of this invention, there is provided an improved image pickup apparatus for use in picking up a seamless panoramic image in a multi-screen. The improved image pickup apparatus comprises a first image pickup means having a first angle of view which is capable of picking up a first image therein and which has a first left and right side boundary lines; a second image pickup means adjacent to the first image pickup means having a second angle of view which is capable of picking up any image therein and which has a second left and right side boundary lines; a third image pickup means adjacent to the second image pickup means having a third angle of view which is capable of picking up any image therein and which has a third left and right side boundary lines; primary reflection means for supplying the first image pickup means with a first reversed image responsive to the first image, the primary reflection means being positioned so as to make the first left side boundary line of the reversed image be matching with the second left side boundary line; secondary reflection means for supplying the third image pickup means with a third reversed image responsive to the third image, the secondary reflection means being positioned so as to make the third right side boundary line of the reversed image be matching with the second right side boundary line; and inversion means for inverting the first and the third reversed images to obtain the first and the third images.

The inversion means may invert the first and the third reversed images electrically.

The inversion means may invert the first and the third reversed images optically.

The first, the second and the third image pickup means may be capable of picking up the first, the second and the third images in water.

According to another aspect of this invention, the image pickup apparatus further comprises first, second, and third rotation means for rotating the first, the second, and the third image pickup means, respectively; first, second, and third sliding means for sliding the first, the second, and the third image pickup means, respectively; first, second, and third movable attaching means for attaching the first, the second, and the third image pickup means, respectively, to the image pickup apparatus; first, second, and third height adjusting means for adjusting each height of the first, the second, and the third image pickup means, respectively; first, second, and third tilt angle adjusting means for adjusting each tilt angle of the first, the second, and the third image pickup means, respectively; first, second and third rolling adjusting means for adjusting each rolling of the first, the second, and the third image pickup means, respectively; first, second, and third panning function adjusting means for adjusting each panning function of the first, the second, and the third image pickup means, respectively; and primary and secondary position adjusting means for adjusting each position of the primary and secondary reflection means, respectively.

BRIEF DESCRIPTION OF THE DRAWINGS

FIG. 5 is a perspective view of an image pickup apparatus according to a second embodiment of the present invention.

DESCRIPTION OF THE PREFERRED EMBODIMENTS

Figure 1:
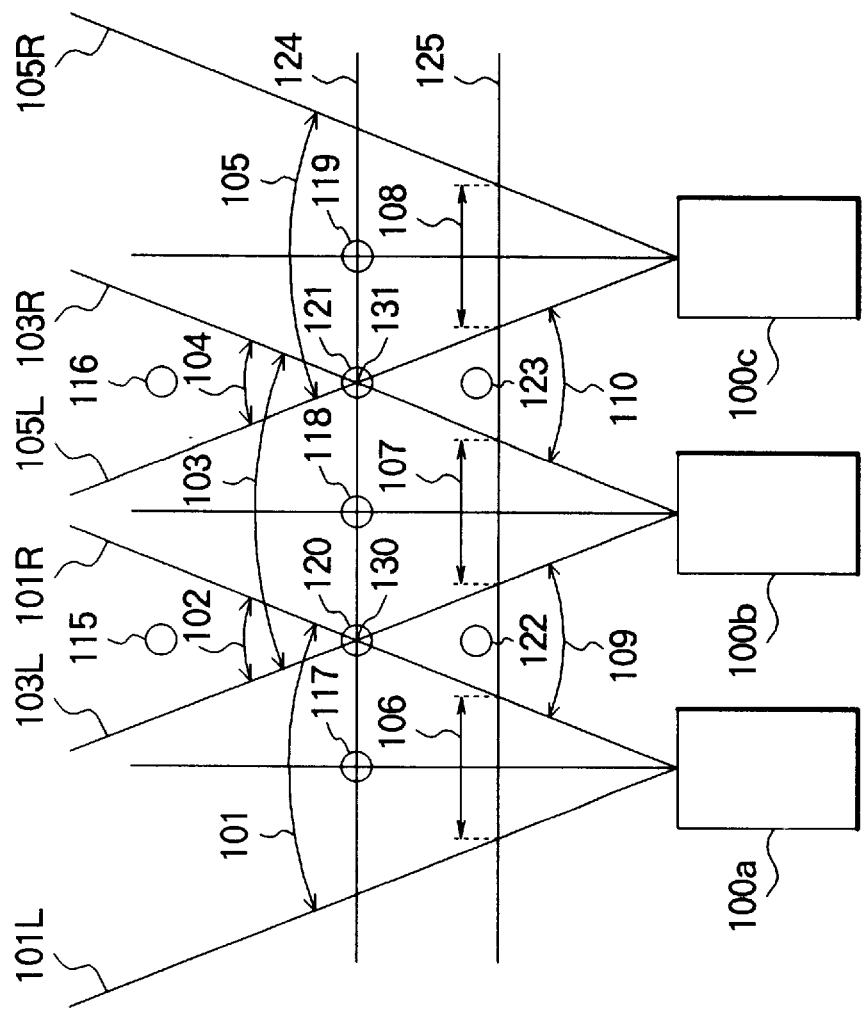
FIG. 1 is a plan view of a conventional image pickup apparatus.
Figure 2:
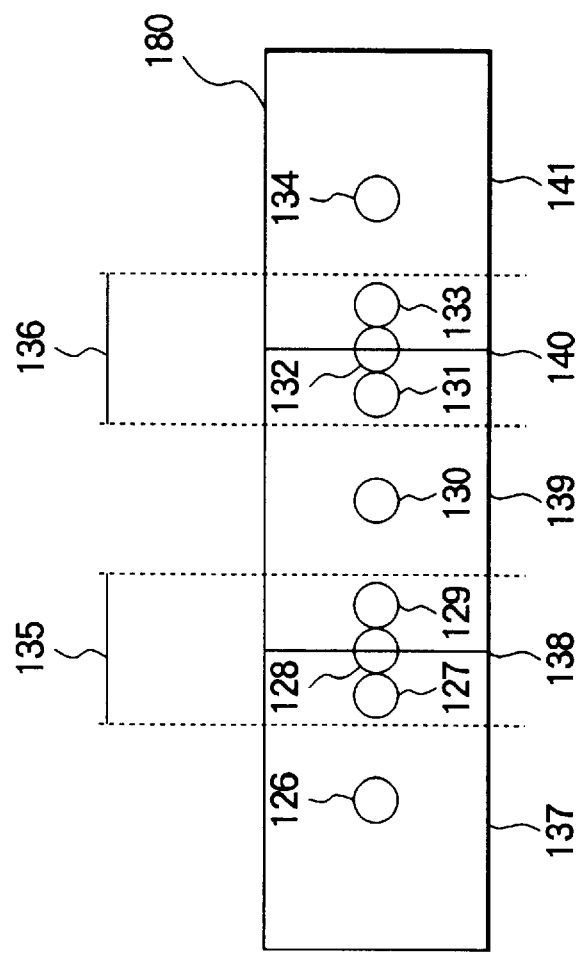
FIG. 2 is a front view of a multi-screen in which images are picked up by the conventional image pickup apparatus illustrated in FIG. 1.

Referring to FIGS. 1 and 2, description will at first be made about a conventional image pickup apparatus for a better understanding of the present invention.

FIG. 1 shows a plan view of the conventional image pickup apparatus for use in picking up a seamless panoramic image in a multi-screen.

In FIG. 1, the image pickup apparatus comprises a first camera 100a, a second camera 100b, and a third camera 100c. The first camera 100a has a first angle of view 101 which is capable of picking up a first image of an object 117 therein and which has a first left and right side boundary lines 101L and 101R. The second camera 100b has a second angle of view 103 which is capable of picking up a second image of an object 118 therein and which has a second left and right side boundary lines 103L and 103R. The third camera 100c has a third angle of view 105 which is capable of picking up a third image of an object 119 therein and which has a third left and right side boundary lines 105L and 105R. On a seamless line 124, a first right side boundary line 101R and a second left side boundary line 103L form a cross point 130 while a second right side boundary line 103R and a third left side boundary line 105L form a cross point 131. With this structure, a seamless panoramic image can be picked up over the seamless line 124. In other words, a continuity of image can be achieved in a junction between image planes over the seamless line 124. Accordingly, for the following description as illustrated in FIGS. 1 and 2, the above-mentioned first image of the object 117, the second image of the object 118 and the third image of the object 119 are picked up to be displayed as displayed images 126, 130 and 134, respectively, in a multi-screen 180. In addition, as illustrated in FIGS. 1 and 2, images of objects 120 and 121 positioned on the cross points 130 and 131 can also be picked up to be displayed as displayed images 128 and 132, respectively, in the multi-screen 180. However, in FIG. 1, the first angle of view 101 and the second angle of view 103 are overlapped with each other to form a cross angle of view 102 while the second angle of view 103 and the third angle of view 105 are overlapped with each other to form a cross angle of view 104. An object 115, which is positioned in an area defined by the cross angle of view 102, is picked up to be displayed as overlapped images 127 and 129 in a section 135 of the multi-screen 180, as illustrated in FIGS. 1 and 2. Further, an object 116, which is positioned in another area defined by the cross angle of view 104, is picked up to be displayed as overlapped images 131 and 133 in another section 136 of the multi-screen 180, as also illustrated in FIGS. 1 and 2. On the other hand, objects 122 and 123, which are positioned in areas defined by angles 109 and 110, respectively, are never picked up by the first, the second, and the third cameras 100a, 100b, and 100c. Consequently, the objects 122 and 123 are not displayed in the multi-screen 180. For example, let an imaginary object pass along a line 125 from the right side of the sheet of FIG. 1 to the left side thereof. The imaginary object is picked up to be displayed in sections 141, 139, and 137 of the multi-screen 180 when the imaginary object is passing through areas 108, 107 and 106 of the line 125, respectively. On the other hand, the imaginary object is never picked up to be displayed anywhere in the multi-screen 180 when the imaginary object is passing through the areas defined by the angles 110 and 109, respectively. As a result, the imaginary object disappears at a junction 140 of the multi-screen 180 and reappears in the section 139 thereof illustrated as in FIG. 2. Thereafter, the imaginary object disappears at a junction 138 of the multi-screen 180 and reappears in the section 137 thereof as illustrated in FIG. 2. Thus, in the conventional image pickup apparatus illustrated in FIG. 1, a continuity of image cannot be achieved in junctions between image planes over the line 125.

Figure 3:
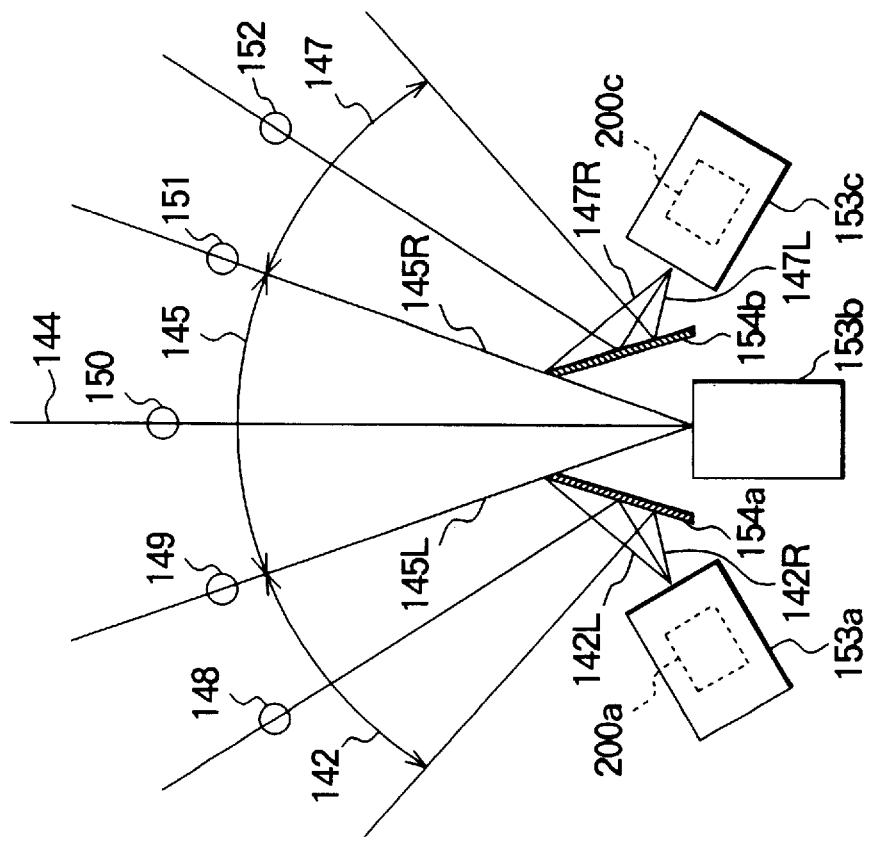
FIG. 3 is a plan view of an image pickup apparatus according to a first embodiment of the present invention.
Figure 4:
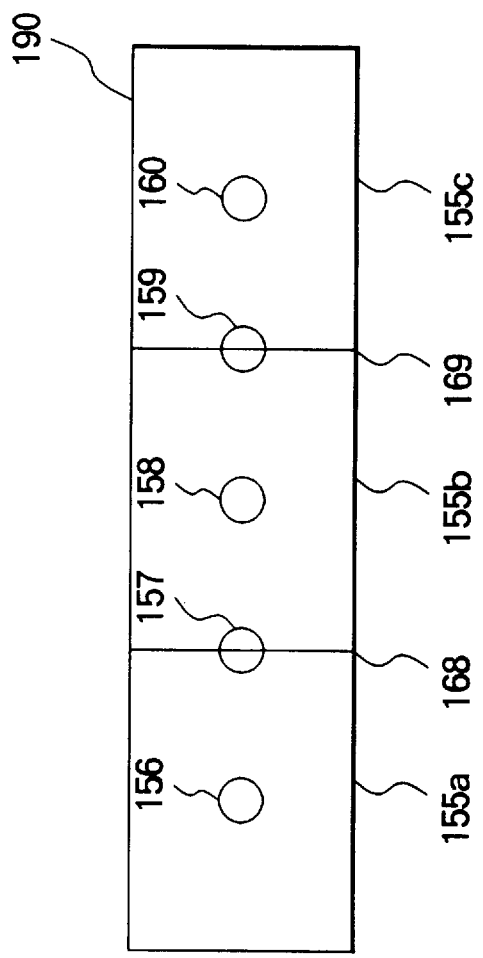
FIG. 4 is a front view of a multi-screen in which images are picked up by the image pickup apparatus illustrated in FIG. 3.

Referring to FIGS. 3 and 4, description will proceed to an image pickup apparatus according to a first embodiment of the present invention.

The image pickup apparatus according to the first embodiment of the present invention is for use in picking up a seamless panoramic image in a multi-screen of three planes.

As illustrated in FIG. 3, the image pickup apparatus has a first camera 153a, a second camera 153b adjacent to the first camera 153a, and a third camera 153c adjacent to the second camera 153b, as first, second, and third image pickup units, respectively. The first camera 153a has a first angle of view 142 which is capable of picking up a first image of an object 148 therein and which has a first left and right side boundary lines 142L and 142R. The second camera 153b has a second angle of view 145 which is capable of picking up a second image of an object 150 therein and which has a second left and right side boundary lines 145L and 145R. The third camera 153c has a third angle of view 147 which is capable of picking up a third image of an object 152 therein and which has a third left and right side boundary lines 147L and 147R.

The image pickup apparatus further has primary and secondary reflection mirrors 154a and 154b as primary and secondary reflection units. The primary reflection mirror 154a supplies the first camera 153a with a first reversed image responsive to the first image of the object 148. The primary reflection mirror 154a is positioned so as to make the first left side boundary line 142L be matching with the second left side boundary line 145L. The secondary reflection mirror 154b supplies the third camera 153c with a third reversed image responsive to the third image of the object 152. The secondary reflection mirror 154b is positioned so as to make the third right side boundary line 147R be matching with the second right side boundary line 145R.

As depicted by broken lines in FIG. 3, the image pickup apparatus further has primary and secondary inversion sections 200a and 200c. The primary inversion section 200a is contained in the first camera 153a to invert the first reversed image to obtain the first image of the object 148. The secondary inversion section 200c is contained in the third camera 153c to invert the third reversed image to obtain the third image of the object 152. In this embodiment, the primary and the secondary inversion sections 200a and 200c invert the first and the third reversed images electrically.

In the image pickup apparatus according to the first embodiment of the present invention, images picked up by the first and the third cameras 153a and 153c are joined with an image picked up by the second camera 153b, respectively, to form the seamless panoramic image in the multi-screen of three planes. In this embodiment, all the first, the second, and the third cameras 153a, 153b, and 153c, as well as the lens attached thereto, are the same type of ones as each other. Focal lengths and iris diaphragms in the first, the second, and the third cameras 153a, 153b, and 153c are determined to be the same ones as each other. The first and the third cameras 153a and 153c are symmetrically installed with respect to a central line 144 in the second angle of view 145 of the second camera 153b. Then, the primary reflection mirror 154a is installed in contact with an outside of the second left side boundary line 145L by one end thereof. On the other hand, the secondary reflection mirror 154b is installed in contact with an outside of the second right side boundary line 145R by one end thereof. The installation angles of the first camera 153a and the primary reflection mirror 154a are determined so as to make the first angle of view 142 just adjacent to the second angle of view 145. The installation angles of the third camera 153c and the secondary reflection mirror 154b are determined so as to make the third angle of view 147 just adjacent to the second angle of view 145. The first, the second and the third angles of view 142, 145, and 147 spread to form a fan-shape, as illustrated in FIG. 3.

In the Interim, images picked up by the first and the third cameras 153a and 153c are reversed by their left and right sides, because the images are picked up through the primary and the secondary reflection mirrors 154a and 154b, respectively. The first and the third reversed images are electrically inverted by the primary and the secondary inversion sections 200a and 200c, respectively, to form the original first and the third images, as mentioned before. As a result, no dead area is caused to exist in the jointed first, second, and third angles of view 142, 145, and 147.

The following description is with reference to FIG. 3 and 4. With this structure, objects 148, 150, and 152 are picked up by the first, the second, and the third cameras 153*a,* 153*b* and 153*c,* as illustrated in FIG. 3. The objects 148, 150, and 152 are displayed as displayed images 156, 158, and 160 in sections 155*a,* 155*b,* and 155*c,* respectively, of a multi-screen 190, as illustrated in FIG. 4. Furthermore, even the objects 149 and 151 are displayed as displayed images 157 and 159 in junctions 168 and 169, respectively, of the multi-screen 190, as illustrated in FIG. 4. Thus, overlap of the images can be prevented, as illustrated in FIG. 4. Accordingly, a seamless panoramic image in the multi-screen 190 of three planes can be picked up without any overlap or lack of images, even though an object pass through any areas of the first, the second and the third angles of view 142, 145 and 147.

Referring to FIG. 5, description will proceed to an image pickup apparatus according to a second embodiment of the present invention.

In this embodiment, first, second, and third video cameras are capable of picking up first, second, and third images in water.

As illustrated in FIG. 5, the image pickup apparatus according to the second embodiment comprises first, second, and third underwater blimps 161*a,* 161*b,* and 161*c* which contain the first, the second, and the third, e.g., video, cameras therein, respectively, reflection mirrors 162*a* and 162*b,* supporting portion 164*a* and 164*b* which function to rotate the reflection mirrors 162*a* and 162*b,* respectively, supporting portion 170*a* and 170*b* which function to slide the reflection mirrors 162*a* and 162*b,* respectively, adjusting screws 165*a,* 165*b,* and 165*c* for adjusting each height and tilt angle of the first, the second, and the third video cameras, rolling adjusting guides 166*a,* 166*b,* and 166*c* for adjusting each rolling of the first, the second, and the third underwater blimps 161*a,* 161*b,* and 161*c,* panning adjusting racks 163*a,* 163*b,* and 163*c* for adjusting each panning of the first, the second, and the third underwater blimps 161*a,* 161*b,* and 161*c,* a base rack 167 for fixing the first, the second, and the third underwater blimps 161*a,* 161*b,* and 161*c* upon one surface.

In this embodiment, images picked up by the first and the third video cameras contained in the first and the third underwater blimps 161*a* and 161*c* are jointed with an image picked up by the second video camera contained in the second underwater blimp 161*b*. Thus, the seamless panoramic image is formed in the multi-screen of three planes. In addition, all the first, the second, and the third video cameras, as well as the lens attached thereto, are the same type of ones as each other. Focal lengths and iris diaphragms in the first, the second, and the third video cameras are determined to be the same ones as each other. The first and the third underwater blimps 161*a* and 161*c* are symmetrically installed with respect to a central line in the second angle of view of the second video camera contained in the second underwater blimp 161*b*. By rotating the reflection mirrors 162*a* and 162*b,* the supporting portion 164*a* and 164*b* are used for adjusting incident angles of the images picked up by the first and the third video cameras with respect to the second angle of view of the second video camera. The supporting portion 170*a* and 170*b* are used for a fine adjustment of junctions between images. The adjusting screws 165*a,* 165*b,* and 165*c* are used for a fine adjustment of each height of the first, the seconds and the third underwater blimps 161*a,* 161*b,* and 161*c*. The adjusting screws 165*a,* 165*b,* and 165*c* are also used for a fine adjustment of each tilt angle of the first, the second, and the third underwater blimps 161*a,* 161*b,* and 161*c*. Thereby, an adjustment of balance is achieved between the first, the second, and the third underwater blimps 161*a,* 161*b,* and 161*c*. By rolling each of the first, the second, and the third underwater blimps 161*a,* 161*b,* and 161*c,* the rolling adjusting guides 166*a,* 166*b,* and 166*c* are used for a horizontal adjustment of angles of view of the three video cameras. The panning adjusting racks 163*a,* 163*b,* and 163*c* are used for adjusting angles of the first, the second, and the third underwater blimps 161*a,* 161*b,* and 161*c* in a horizontal direction. By the use of these functions of adjustments obtained in the image pickup apparatus, the adjustments can be achieved similarly to those of the first embodiment. Consequently, the seamless panoramic image can be picked up on the multi-screen of three planes even in water.

While this invention has thus far been described in conjunction with only several embodiments thereof, it will readily be possible for those skilled in the art to put this invention into practice in various other manners.

For example, in the above-mentioned embodiments, description is made about examples in which the present invention is applied to an image pickup apparatus for use in picking up the seamless panoramic image on the multi-screen of three planes. However, the present invention can also be applied to an image pickup apparatus for use in picking up the seamless panoramic image on a multi-screen of two planes. In this case, the image pickup apparatus may comprise only first and second cameras as image pickup units, a single reflection mirror as a reflection unit, and a single inversion section.

Moreover, in the above-mentioned embodiments, the primary and the secondary inversion sections 200*a* and 200*c* invert the first and the third reversed images electrically. However, the primary and the secondary inversion sections may invert the first and the third reversed images optically.

What is claimed is:

1. An image pickup apparatus for use in picking up a seamless panoramic image for a multi-screen display, comprising:

first image pickup means having a first angle of view which is capable of picking up a first image therein and which has a first left and right side boundary lines;

second image pickup means adjacent to said first image pickup means having a second angle of view which is capable of picking up a second image therein and which has a second left and right side boundary lines as viewed by said second image pickup means;

third image pickup means adjacent to said second image pickup means having a third angle of view which is capable of picking up a third image therein and which has a third left and right side boundary lines;

primary reflection means for supplying said first image pickup means with a first reversed image responsive to said first image, wherein said first left and right side boundary lines are, respectively, a left and right side boundary line of said first reversed image as viewed by said first image pickup means, said primary reflection means being positioned so as to cause said first left side boundary line to match with said second left side boundary line;

secondary reflection means for supplying said third image pickup means with a third reversed image responsive to said third image, wherein said third left and right side boundary lines are, respectively a left and right side boundary lines of said third reversed image as viewed by said third image pickup means, said secondary reflection means being positioned so as to cause said third right side boundary line to match with said second right side boundary line;

a three dimensional rotational means for rotating said first, said second, and said third image pickup means, respectively; and inversion means for inverting said first and said third reversed images to obtain said first and said third images.

2. An image pickup apparatus as recited in claim 1, wherein said inversion means inverts said first and said third reversed images electrically.

3. An image pickup apparatus as recited in claim 1, wherein said inversion means inverts said first and said third reversed images optically.

4. An image pickup apparatus as recited in claim 1, wherein said first, said second, and said third image pickup means are capable of picking up said first, said second and said third images in water.

5. An image pickup apparatus as recited in claim 4, wherein said three dimensional rotational means further comprises:

first, second, and third sliding means for sliding said first, said second, and said third image pickup means, respectively;

first, second, and third movable attaching means for attaching said first, said second, and said third image pickup means, respectively, to said image pickup apparatus;

first, second, and third height adjusting means for adjusting each height of said first, said second, and said third image pickup means, respectively;

first, second, and third tilt angle adjusting means for adjusting each tilt angle of said first, said second, and said third image pickup means, respectively;

first, second, and third rolling adjusting means for adjusting each rolling of said first, said second, and said third image pickup means, respectively;

first, second and third panning function adjusting means for adjusting each panning function of said first, said second, and said third image pickup means, respectively; and primary and secondary position adjusting means for adjusting each position of said primary and secondary reflection means, respectively.

6. An image pickup apparatus for use in picking up a seamless panoramic image for a multi-screen display, comprising:

first image pickup means having a first angle of view which is capable of picking up a first image therein and which has a first left and right side boundary lines;

second image pickup means adjacent to said first image pickup means having a second angle of view which is capable of picking up a second image therein and which has a second left and right side boundary lines as viewed by said second image pickup means;

third image pickup means adjacent to said second image pickup means having a third angle of view which is capable of picking up a third image therein and which has a third left and right side boundary lines;

primary reflection means for supplying said first image pickup means with a first reversed image responsive to said first image, wherein said first left and right side boundary lines are, respectively, a left and right side boundary lines of said first reversed image as viewed by said first image pickup means, said primary reflection means being positioned so as to make said first left side boundary line match with said second left side boundary line;

secondary reflection means for supplying said third image pickup means with a third reversed image responsive to said third image, wherein said third left and right side boundary lines are, respectively, a left and right side boundary lines of said third reversed image as viewed by said image pickup means, said secondary reflection means being positioned so as to make said third right side boundary line match with said second right side boundary line;

a three dimensional rotational means for rotating said first, said second, and said third image pickup means, respectively;

primary inversion means for inverting said first reversed image to obtain said first image; and secondary inversion means for inverting said third reversed image to obtain said third image.

7. An image pickup apparatus for use in picking up a seamless panoramic image for a multi-screen display, comprising:

first image pickup means having a first angle of view which is capable of picking up a first image therein and which has a first left and right side boundary lines;

second image pickup means adjacent to said first image pickup means having a second angle of view which is capable of picking up a second image therein and which has a second left and right side boundary lines;

reflection means for supplying said first image pickup means with a first reversed image responsive to said first image, wherein said first left and right side boundary lines are, respectively, a left and right side boundary lines of said first reversed image as viewed by said first image pickup means, said primary reflection means being positioned so as to make said first left side boundary line be matching with said second left side boundary line;

a three dimensional rotational means for rotating said first, said second, and said third image pickup means, respectively;

inversion means for inverting said first reversed image during an interim time interval to obtain said first image.

8. An image pickup apparatus as recited in claim 7, wherein said inversion means inverts said first reversed image electrically.

9. An image pickup apparatus as recited in claim 7, wherein said inversion means inverts said first reversed image optically.

* * * * *